No. 671,687. Patented Apr. 9, 1901.
J. H. BULLARD.
BRACE FOR MOTORS OF SELF PROPELLED VEHICLES.
(Application filed Aug. 1, 1900.)
(No Model.) 2 Sheets—Sheet 2.
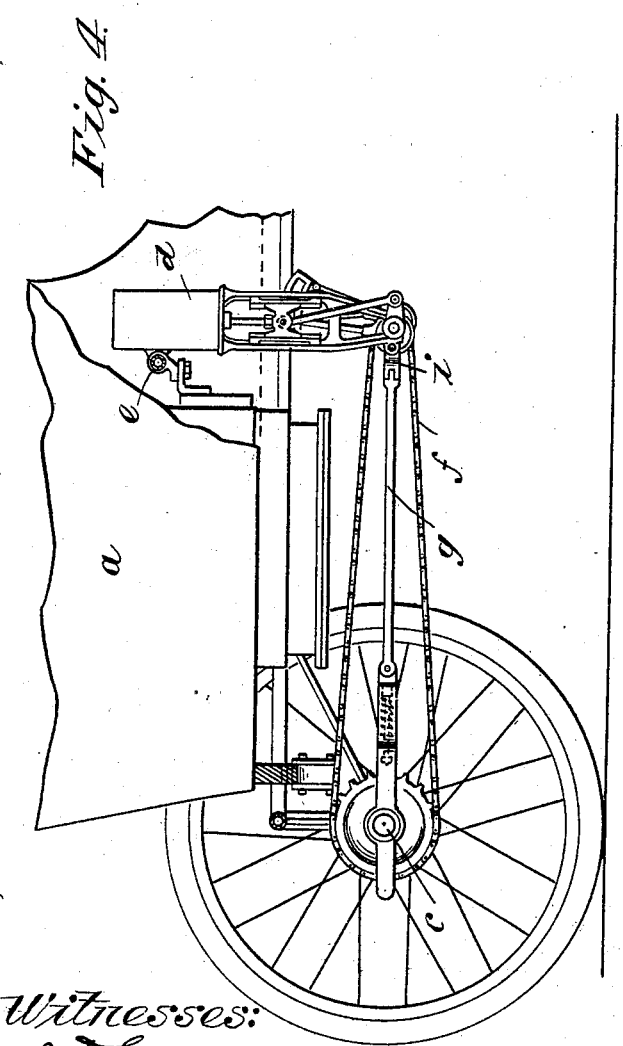
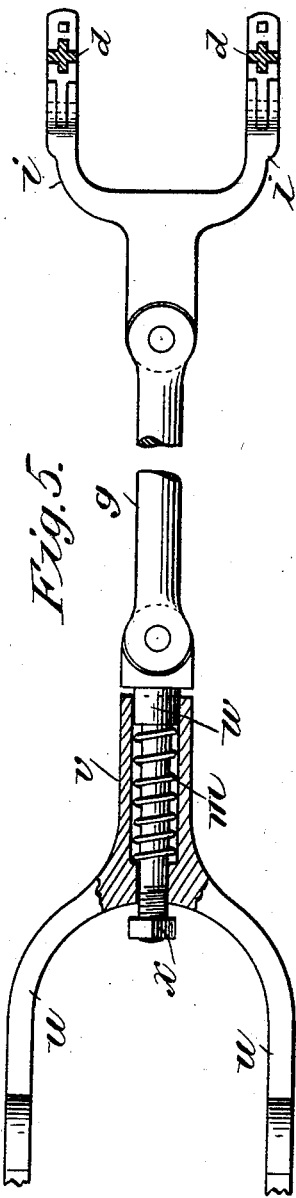

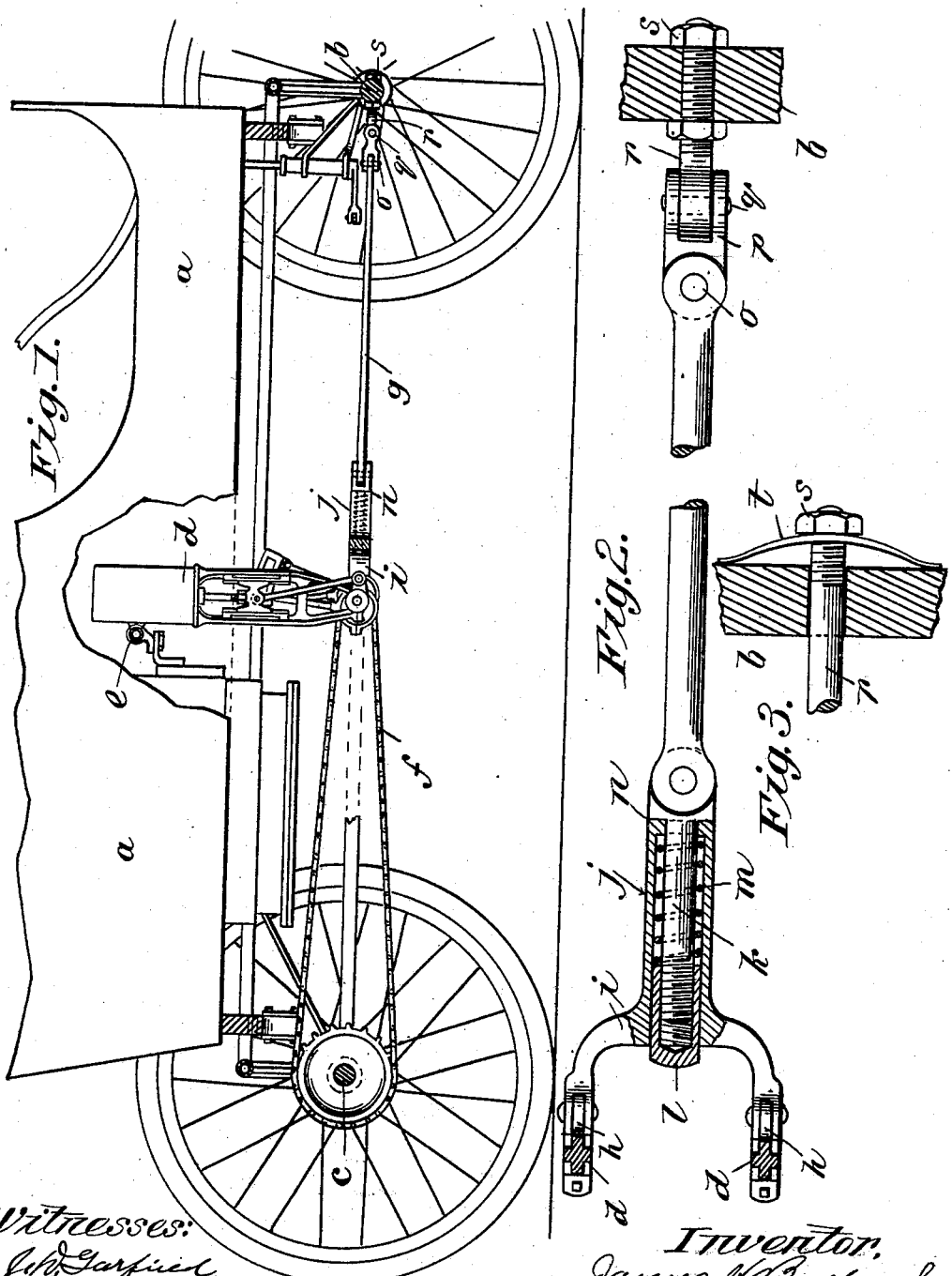

UNITED STATES PATENT OFFICE.

JAMES H. BULLARD, OF SPRINGFIELD, MASSACHUSETTS, ASSIGNOR TO OVERMAN AUTOMOBILE COMPANY, OF CHICOPEE, MASSACHUSETTS.

BRACE FOR MOTORS OF SELF-PROPELLED VEHICLES.

SPECIFICATION forming part of Letters Patent No. 671,687, dated April 9, 1901.

Application filed August 1, 1900. Serial No. 25,556. (No model.)

*To all whom it may concern:*

Be it known that I, JAMES H. BULLARD, a citizen of the United States of America, residing at Springfield, in the county of Hampden and State of Massachusetts, have invented new and useful Improvements in Braces for Motors of Self-Propelled Vehicles, of which the following is a specification.

This invention relates to automobile vehicles, and particularly to that class in which the engine or motor is connected by a driving-chain with the driving-axle of the vehicle and in which the engine has more or less of a swinging movement in line with said chain.

One object of this invention is to provide a yielding brace between the engine and the vehicle, whereby if any sudden strain be put upon the driving-chain by reason of striking an obstruction in the road or some similar cause the said brace may yield and thus save the engine or drive-chain from injury.

A further object of the invention consists in the construction of a brace of the character described adapted to permit more or less torsional movement of the frame of the running-gear without bringing any lateral strains on the engine through the connection of the latter with said frame.

The invention consists in the construction as fully described in the following specification and particularly pointed out in the claims.

In the drawings forming part of this specification, Figure 1 shows a motor-vehicle in side elevation, partly broken away, showing my invention applied thereto and extending between the engine of the vehicle and the front axle thereof. Fig. 2 is a plan view, partly in section, of a brace-rod constructed according to my invention. Fig. 3 is a modification of the construction shown in Fig. 2. Fig. 4 is a side elevation of the rear end of a motor-vehicle, showing the brace which is the subject of the invention extending from the engine to the rear axle. Fig. 5 is a plan view, partly in section, of the brace running to the rear axle constructed according to this invention.

Referring to the drawings, $a$ indicates the body of the vehicle, $b$ the front axle thereof, and $c$ the rear axle.

$d$ indicates the engine, pivotally supported on the vehicle-frame at $e$.

$f$ indicates the drive-chain, and $g$ the yielding brace extending between the engine and the axle of the vehicle. In the drawings the said brace is shown adapted to extend either to the front or rear axle, as may be desired, and it is obvious that in case the brace runs to the front axle $b$ then it must be adapted to yield under a pulling strain, and in case the brace runs to the rear axle $c$ it must be adapted to yield under a pushing strain. As stated above, the brace is likewise adapted to yield to whatever torsional movements the running-gear of the vehicle may be subjected to, and to that end said brace is provided with joints, whereby the opposite ends thereof may yield in any direction to adapt themselves to the movements of the axle and engine.

Referring to Figs. 1 and 2, the engine-frame is provided with two eyes $h$ near the lower end thereof, (see Fig. 2,) to which the ends of a fork $i$ are pivotally connected. This fork has a stem $j$, which is bored out to receive the rod $k$, the end of which within said stem is screw-threaded and on which is screwed the nut $l$. The said rod $k$ is of smaller diameter than the interior of said stem $j$, and the nut $l$ is adapted to fit the hole in the stem and slide therein. The end of the nut and the inner end of said hole in the stem constitute points of bearing for a spring $m$, which encircles said rod. Said nut is made in the shape of a long cylinder with its outer end closed to the end that ample room may be provided for the adjustments of the nut on said rod to put more or less tension on the spring $m$ and still keep dust, &c., out of the hole in the stem $j$. The end of said rod opposite to that on which the nut is located is provided with a broader end, whereby there is provided a shoulder $n$, yieldingly held against the end of the stem $j$ by the spring $m$. Said broad end of the rod $k$ is pivotally connected with one end of the body of the brace $g$, which is a metal rod of suitable rigidity and strength. This pivotal connection adapts the parts to swing in a horizontal plane only. The opposite end of said rod is pivotally connected at o, also in a manner adapting it to swing only in a horizontal plane, with a short link p, whose opposite end is pivotally connected at q with a stud r in a manner adapting it to swing only in a vertical plane. Said stud r may be secured to the front axle b in any manner which will permit it to be adjusted transversely thereof in the direction of the length of the brace g. A convenient manner of effecting this adjustment is to thread the stud and pass it through a hole in the axle and secure it therein by a nut on each side of the axle, as shown. By loosening the inside nut and by screwing up on the outside nut s the desired tension may be put upon the brace g, for by the operation of this adjustment the spring m will be compressed and the shoulder n on the rod k may be drawn slightly away from the end of the stem j, and thus the normal tension on the drive-chain f will be determined by the power of the said spring.

In Fig. 3 is shown a modification of the construction shown in Fig. 2. By means of this modified construction the spring m may be done away with and a substitute provided therefor by putting a bow-string t under the nut s, having its ends bearing on the axle, as shown. In that case, however, the rod k would be omitted and the stem j pivoted directly to the body part of the brace. The preferred construction, however, is that shown in Fig. 2.

In Figs. 4 and 5 the brace is shown as constructed when applied between the engine and the rear axle of the vehicle. As seen by a glance at the drawings, but a slight change is required to adapt the brace to this position, and this consists in adapting the spring m to receive the thrust of the brace from a direction reversed to that in which said spring receives it when the brace runs to the front axle. The change in construction necessitated by this change in location is very slight and is as follows: At the rear axle end of the brace a yoke u pivotally engages the rear axle c and incloses the driving-sprocket on the latter. Said yoke is provided with a stem v, which, like the stem j, is bored out to receive a rod similar to the rod k. This rod is made, like the rod k, of a smaller diameter than the hole in the stem v, except for the part w thereof, which has a sliding fit in the end of the hole in said stem. The free end of the rod is screw-threaded and passes into the space inclosed by said yoke u and a nut x is applied thereto. The lower end of the hole bored in the stem v is bored through the yoke the same size as the smaller portion of the rod—viz., its threaded end—and the spring m when slipped over the end of said rod and the latter placed in said stem will bear at one end on the shoulder formed by the two diameters of the rod, and at the other end thereof said spring will bear against the bottom of the hole in the stem v. The opposite end of the brace is provided with the fork i, attached pivotally to the engine, as in Figs. 1 and 2, and between the opposite ends of said brace the same provision is made for vertical and horizontal movements of the engine and running-gear of the vehicle as was described with relation to the brace running from the engine to the front axle.

In the construction shown in Fig. 5 when the brace is put onto the vehicle the nut x is operated to shorten the brace as much as possible, and the chain is then put on the sprockets on the engine and the driving-shaft, after which the nut x is loosened and the spring m in the stem v allowed to take up all slack of the chain and put upon it whatever tension it is designed to impart thereto.

Having thus described my invention, what I claim, and desire to secure by Letters Patent of the United States, is—

1. In combination with a driving-axle of a self-propelled vehicle, an engine adapted to swing more or less toward and from the axle, a flexible driving member extending between said engine and said axle, and an endwise-yielding brace, the opposite ends of which are secured, respectively, to said engine and to a part of the vehicle, substantially in line with said driving member, substantially as described.

2. In a self-propelled vehicle, the combination with the driving-axle thereof, of an engine adapted to swing toward and from said axle, a flexible driving member extending between said engine and axle, and an endwise-yielding brace, the opposite ends of which are pivotally secured respectively to said engine and to said vehicle at a point on the latter, substantially in line with said driving member, substantially as described.

3. In a self-propelled vehicle, the combination with the driving-axle thereof, of an engine adapted to swing toward and from said axle, a flexible driving member extending between said engine and axle, a brace extending between and secured respectively to the engine and the vehicle consisting of two parts endwise movable, and a spring between said parts, whereby said driving member is placed normally under a tension equal to the power of said spring, substantially as described.

4. In combination with a driving-axle of a self-propelled vehicle, an engine adapted to swing more or less toward and from the axle, a flexible driving member extending between said engine and said axle, and an endwise-yielding brace, the opposite ends of which are secured, respectively, to said engine and to a part of the vehicle, and joints in said brace whereby one end of the latter may be moved relative to the other in any direction, substantially as described.

5. In a self-propelled vehicle, an engine, a driving-axle, a flexible member adapted to transmit movement from said engine to said axle, a brace between said engine and a point on said vehicle substantially in line with said flexible member, said brace consisting of parts adapted to slide one relative to the other, endwise, and a spring between the said endwise-moving parts of the brace, substantially as described.

JAMES H. BULLARD.

Witnesses:
WM. H. CHAPIN,
K. I. CLEMONS.